United States Patent [19]

Chen

[11] Patent Number: 5,381,252

[45] Date of Patent: * Jan. 10, 1995

[54] OPPOSED SCANNING ELECTRON BEAMS LIGHT SOURCE FOR PROJECTION LCD

[75] Inventor: Hsing-Yao Chen, Barrington, Ill.

[73] Assignee: Chunghawa Picture Tubes, Ltd., Taoyuan, Taiwan, Prov. of China

[ * ] Notice: The portion of the term of this patent subsequent to Apr. 12, 2011 has been disclaimed.

[21] Appl. No.: 79,900

[22] Filed: Jun. 22, 1993

[51] Int. Cl.$^6$ .................. G02F 1/1335; H04N 5/74
[52] U.S. Cl. ............................ 359/48; 359/40; 348/776
[58] Field of Search ............. 359/40, 41, 48; 348/776, 779, 790, 792, 793

[56] References Cited

U.S. PATENT DOCUMENTS

| | | | |
|---|---|---|---|
| 4,127,322 | 11/1978 | Jacobson et al. | 353/31 |
| 4,196,370 | 4/1980 | Hughes | 313/413 |
| 4,544,237 | 10/1985 | Gagnon | 350/331 |
| 4,611,889 | 9/1986 | Buzak | 350/337 |
| 4,758,818 | 7/1988 | Vatne | 340/701 |
| 4,842,374 | 6/1989 | Ledebuhr | 350/337 |
| 4,933,604 | 6/1990 | Noda et al. | 315/169.3 |
| 4,951,150 | 8/1990 | Browning | 358/231 |
| 5,089,883 | 2/1992 | Welker et al. | 358/60 |
| 5,103,328 | 4/1992 | Numao | 359/53 |
| 5,128,782 | 7/1992 | Wood | 309/48 |
| 5,135,300 | 8/1992 | Toide et al. | 353/31 |
| 5,140,449 | 8/1992 | Sluzky et al. | 359/50 |
| 5,142,388 | 8/1992 | Watanabe et al. | 359/50 |
| 5,144,471 | 9/1992 | Takanashi et al. | 359/245 |
| 5,146,354 | 8/1992 | Plesenger et al. | 359/49 |
| 5,146,355 | 9/1992 | Prince et al. | 359/50 |
| 5,162,786 | 11/1992 | Fukuda | 340/784 |
| 5,162,930 | 11/1992 | Sluzky et al. | 359/50 |
| 5,175,637 | 12/1992 | Jones et al. | 359/48 |
| 5,214,521 | 5/1993 | Kwon et al. | 359/54 |
| 5,268,775 | 12/1993 | Zeidler | 359/40 |
| 5,303,054 | 4/1994 | Chen | 348/766 |

Primary Examiner—Anita Pellman Gross
Assistant Examiner—Charles Miller
Attorney, Agent, or Firm—Emrich & Dithmar

[57] ABSTRACT

A projection liquid crystal display (LCD) system includes a liquid crystal display panel including a first plurality of horizontally aligned transparent conductive scanning electrodes and a second plurality of vertically aligned transparent conductive signal electrodes disposed on opposed surfaces of the panel. Light directed onto the display panel's aft surface is transmitted through the panel as each horizontal linear array of electrodes is turned "ON", with the horizontal linear arrays sequentially turned on for vertically scanning the display panel in a stepwise manner. LCD backlighting is provided by a cathode ray tube (CRT) having a phosphor-bearing faceplate which emits light when an electron beam is incident thereon. The CRT includes two electron beams which are directed onto the faceplate's inner phosphor layer and are deflected in opposed directions along a common horizontal scan line, where each horizontal scan line on the CRT's faceplate is traced in sequence by the two beams. Each horizontal scan of the CRT's faceplate by the two electron beams is synchronized with the turning on of the vertically spaced, horizontal arrays of the first scanning electrodes to provide a single line light source for illuminating only that portion of the display panel containing video information for improved video image contrast and more efficient LCD panel backlighting. The total electron beam energy at each faceplate pixel when integrated over an entire horizontal scan line period is essentially constant when both beams have equal Gaussian beam density distributions to provide uniform illumination over the entire horizontal scan line.

18 Claims, 3 Drawing Sheets

Electric field OFF-
Scattering

Electric field ON-
Transparent

OPPOSED SCANNING ELECTRON BEAMS LIGHT SOURCE FOR PROJECTION LCD

FIELD OF THE INVENTION

This invention relates generally to projection liquid crystal displays (LCDs) such as used in television receivers and computer terminals and is particularly directed to a backlighting arrangement for a projection LCD display which provides improved video image contrast and more efficient display backlighting.

BACKGROUND OF THE INVENTION

Liquid crystal displays (LCD's) are commonly used in television receivers, portable computer displays, and other electronic devices. An LCD requires a source of backlight for operation because the LCD operates effectively as a light valve, allowing transmission of light in one state and blocking transmission of light in a second state. The typical LCD panel structure includes a liquid crystal polymer encapsulated between at least two planar glass plates in parallel with each other. A polarization layer is bonded to the outer surface of each glass plate such that the glass plates are sandwiched between two polarization layers.

The inner surface, or the surface facing the liquid crystal polymer, of each glass plate includes mutually perpendicularly oriented, conductive, transparent linear arrays of electrodes. The volume of the liquid crystal polymer between any two orthogonal arrays of electrodes forms a cube whose face area constitutes a pixel. The electrode arrays are connected on the periphery of the glass plates via input/output (I/O) strips for coupling to electronic circuitry for applying a voltage to the two sets of orthogonal conductive transparent electrode arrays. To one set of linear, parallel arrays electrodes is provided video image information (typically to the vertically aligned electrodes), while to the other linear, parallel array of electrodes (typically the array oriented horizontally) are provided "ON" signals in a sequential manner such that each horizontal linear array of electrodes is sequentially turned on rendering the portion of the liquid crystal polymer adjacent the turned-on electrode array transparent for presenting a portion of the video image. The vertically aligned electrodes are known as "signal" electrodes, while the horizontally aligned electrodes are commonly referred to as "scanning" electrodes.

Referring to FIGS. 1a and 1b, the basic operating principal of an LCD is shown in simplified schematic diagram form. As shown in FIG. 1a, the liquid crystal polymer 10 is disposed intermediate first and second transparent electrodes 12 and 14. The aforementioned polarization layers on each side of the liquid crystal polymer 10 are omitted from the figures for simplicity. The liquid crystal polymer 10 is illustrated in simplified form as comprised of a plurality of molecules 16. A voltage source 20 couples the first and second transparent electrodes 12, 14 via a switch 18 which is shown open in FIG. 1a. Without a voltage applied across the liquid crystal polymer 10, the liquid crystal molecules 16 are randomly oriented as shown in FIG. 1a and incident light (shown in the figure as solid arrows) is randomly scattered by the liquid crystal polymer 10 as shown by the arrows in dotted-line form. With switch 18 closed and a voltage applied across the liquid crystal polymer 10, the liquid crystal molecules 18 become aligned and render the liquid crystal polymer transparent. Thus, light incident upon the liquid crystal polymer 10 is transmitted therethrough as shown in FIG. 1b.

In a conventional projection type LCD display, such as shown in simplified schematic diagram form in FIG. 2 as element 26, a light source 28 is placed behind the LCD panel 30 to illuminate the panel and project a video image. Light source 28 may be a fluorescent discharge tube or a metal halide or Xenon arc lamp. The projected video image from LCD panel 30 is focused by means of a lens 32 and directed through an aperture 34a in an aperture stop 34. A projection lens unit 36 then projects the video image onto the aft surface of a projection screen 38.

At any point during operation, the LCD panel 30 has only one horizontal line "ON," with only this line allowing for transmission of light through the panel. Facing electrodes adjacent all other horizontal lines in the LCD panel 30 are OFF. Therefore, most of the light from the light source 28 blocked by the non-transmitting portions of the LCD panel and converted to heat. This arrangement is characterized by low light utilization efficiency, the generation of a substantial amount of heat which must be dissipated, and limited brightness and contrast because of the substantial portion of backlighting which is scattered by the non-transparent portion of the LCD panel. With 525 horizontal scan lines in a conventional projection LCD system, it can be seen that with only 1/525th of the input light utilized for producing a useful image, much energy is wasted in a conventional projection LCD system. This waste will increase in future systems employing high definition television (HDTV) displays which employ over 1000 horizontal scan lines and which will reduce light utilization efficiency even further. In order to increase image brightness and contrast, more powerful light sources are being developed. These more powerful light sources providing more lumens with more watts of power will produce even more heat and make component cooling and heat dissipation even more important design considerations.

This invention addresses the aforementioned limitations of the prior art by providing a backlighting source for a projection LCD system which brightly illuminates only that portion of the LCD panel rendered transparent and containing video information and which maintains the backlighting beam on the transparent portion as it is displaced on the display panel.

OBJECTS AND SUMMARY OF THE INVENTION

Accordingly, it is an object of the present invention to provide improved and more efficient backlighting for a projection type LCD system.

It is another object of the present invention to provide backlighting for only that portion of an LCD display panel which is turned "ON" for more efficient video image backlighting and the reduction of backlight scattering by the display panel.

Yet another object of the present invention is to provide improved contrast and brightness in a backlit LCD panel by illuminating only that portion of the panel upon which video information is presented.

A further object of the present invention is to provide a novel CRT for backlighting an LCD panel.

A still further object of the present invention is to provide a dual beam CRT for backlighting an LCD panel which directs backlight onto only that portion of the panel rendered transparent for displaying a portion of a video image.

These objects of the present invention are achieved and the disadvantages of the prior art are eliminated by a projection display apparatus for projecting a video image on a screen comprising: a liquid crystal display panel including a generally planar layer of liquid crystal material and a first plurality of transparent scanning electrodes and a second plurality of transparent signal electrodes respectively disposed on first and second facing surfaces of the layer of liquid crystal material, wherein the first and second pluralities of electrodes are respectively arranged in first and second linear, spaced, parallel arrays and wherein the first and second arrays are mutually orthogonal such that each of the first linear arrays of scanning electrodes crosses each of the second linear arrays of signal electrodes, and wherein a voltage is applied to each linear array of scanning electrodes in a sequential manner such that video image information is presented sequentially on the liquid crystal display; a cathode ray tube (CRT) including: a faceplate disposed in facing relation to the second surface of the layer of liquid crystal material, the faceplate having a layer of phosphor elements disposed on an inner surface thereof; electron beam generating gun for directing first and second beams of energetic electrons on the inner surface of the faceplate; and a deflection arrangement for deflecting the first and second electron beams over the inner surface of the faceplate in a raster-like manner, wherein the electron beams are displaced over a common scan line in opposed directions with each sweep of the faceplate for forming a narrow, elongated, linear light beam directed toward the liquid crystal display panel as the energetic electrons strike the phosphor elements, wherein the scan line and light beam are aligned generally parallel to the first linear arrays of scanning electrodes; and a controller coupled to the first plurality of scanning electrodes and to the deflection arrangement for synchronously applying a voltage to each linear array of scanning electrodes in a sequential manner and deflecting the electron beams such that the light beam is sequentially directed upon each linear array of scanning electrodes as a voltage is applied to each linear array of scanning electrodes.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1A:
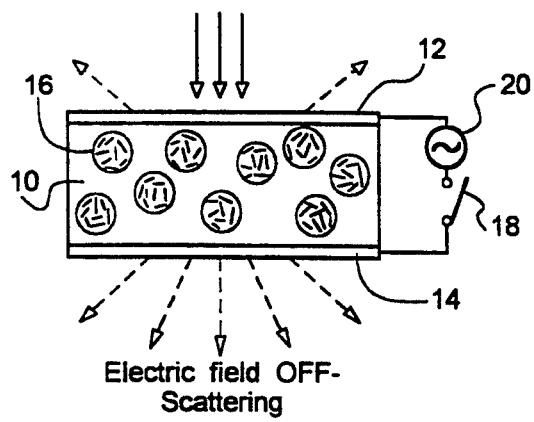
FIGS. 1a and 1b are simplified schematic diagrams of an LCD panel respectively showing the LCD panel non-transparent where incident light is scattered by the LCD panel and transparent by the application of an electric field across the LCD panel.
Figure 1B:
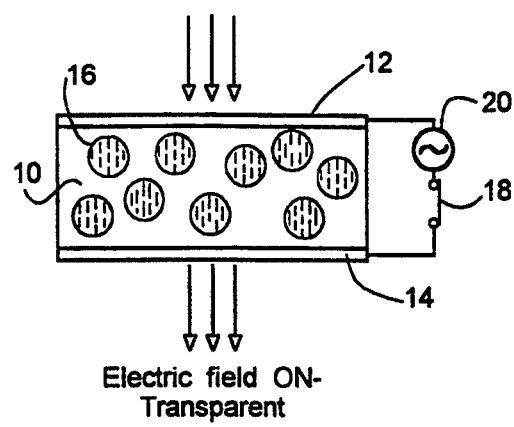
Figure 2:
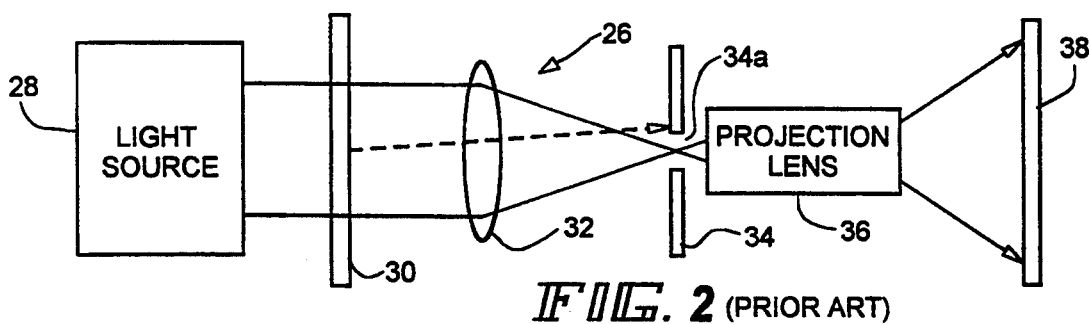
FIG. 2 is a simplified combined schematic and block diagram of a prior art projection type LCD display.
Figure 3:
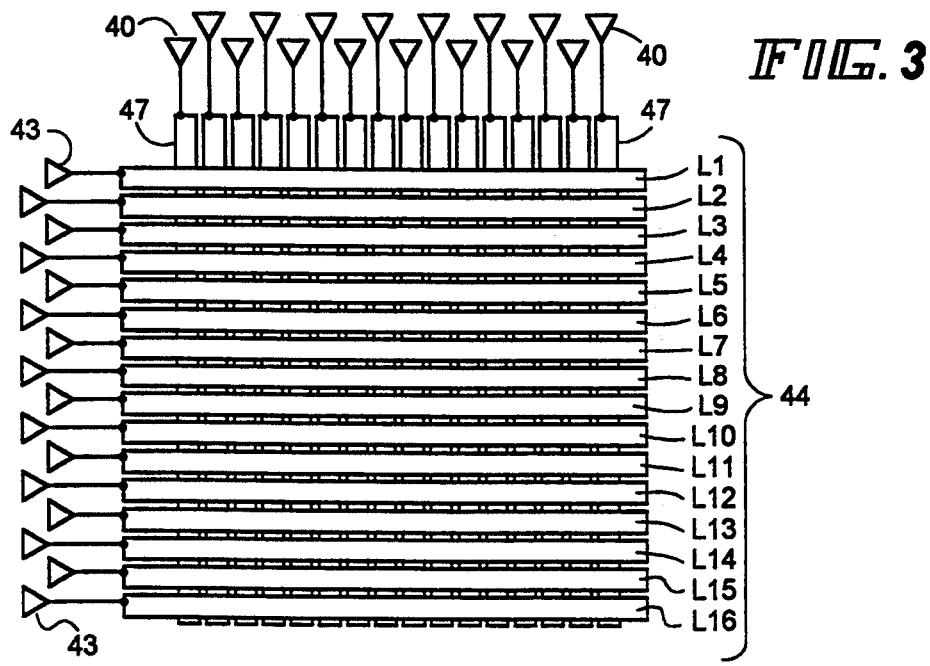
FIG. 3 is a schematic front elevation view of an LCD panel for use with the backlighting source of the present invention.
Figure 4:
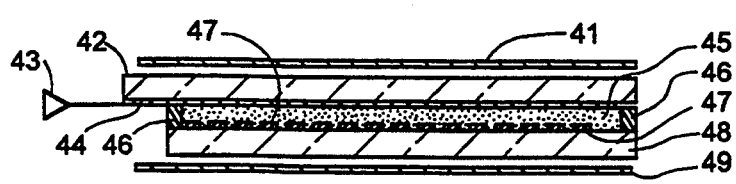
FIG. 4 is a schematic longitudinal cross sectional view of the LCD panel shown in FIG. 3.

Referring to FIGS. 3 and 4, there are respectively shown schematic top plan and longitudinal cross-sectional views of a liquid crystal display device with which the line electron beam light source of the present invention is intended for use. Sixteen transparent conductive scanning electrodes 44 ($L_1$ to $L_{16}$) having a strip shape are formed in parallel with each other on the inner surface of a transparent substrate 42, and sixteen transparent conductive signal electrodes 47 for applying a video signal having a strip shape are formed in parallel with each other on the inner surface of a transparent substrate 48. A ferroelectric liquid crystal layer 45 is formed between the transparent substrates 42 and 48 and is sealed by a sealing element 46. Respective drivers 43 are connected to the respective scanning electrodes 44 ($L_1$ to $L_{16}$) so as to apply voltages $V_C$ thereto. Respective drivers 40 are connected to the respective signal electrodes 47 so as to apply a voltage $V_S$ thereto. Polarizers 41 and 49 arranged to have a crossed Nicols relation are disposed oppositely to each other, and a light source (not shown) is located adjacent the outer surface of polarizer 49.

Portions where the respective electrodes 44 and electrodes 47 overlap form picture elements. Voltages $V_C$ and $V_S$ are applied to corresponding electrodes 44 and 47 so as to bring a picture element formed by one of the signal electrodes 47 to a bright state. In this matrix type display panel, a voltage is sequentially applied to each of the scanning electrodes 44 in typically proceeding downward along the liquid crystal layer 45. As the voltage is applied to each of the scanning electrodes 44, the portion of the video image adjacent the scanning electrode to which the direct current voltage is applied is visible on the liquid crystal layer 45. A set of video image voltages are simultaneous applied to each of the vertically aligned scanning electrodes 44 such that the video image presented on the liquid crystal layer 45 appears uniform and continuous.

Figure 5A:
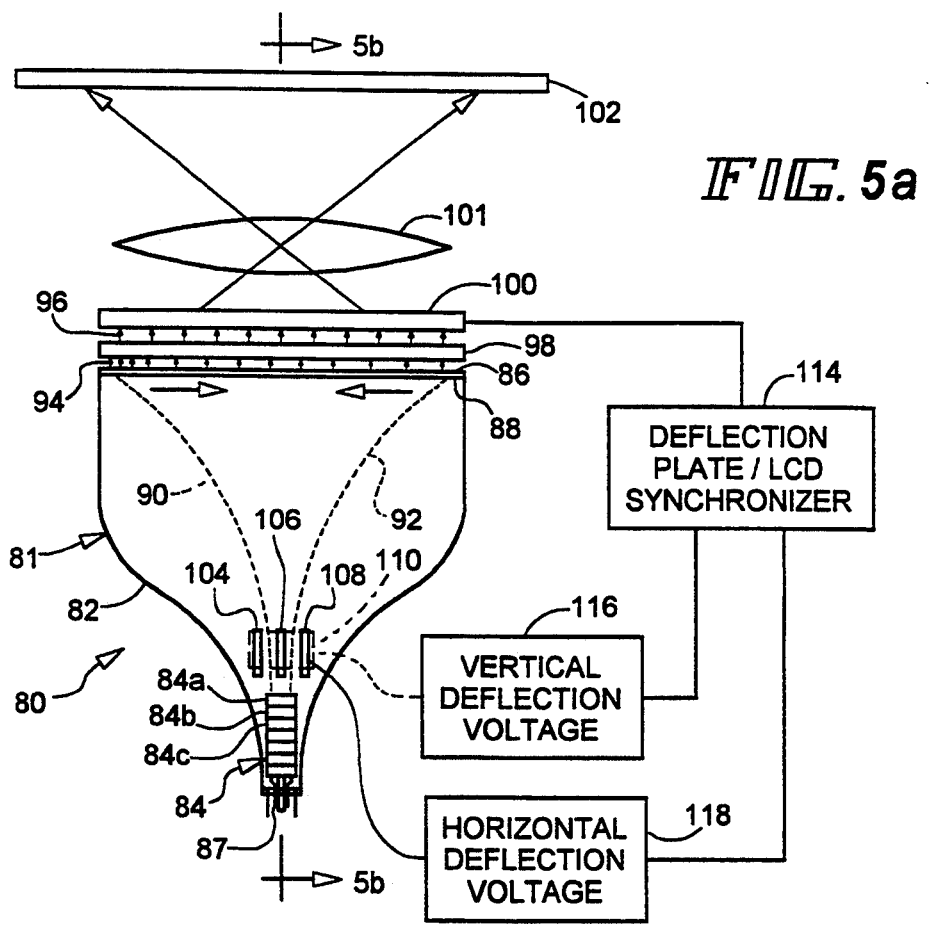
FIG. 5a is a simplified schematic and block diagram of a top view an opposed scanning electron beams light source for use with a projection LCD system in accordance with the present invention.
Figure 5B:
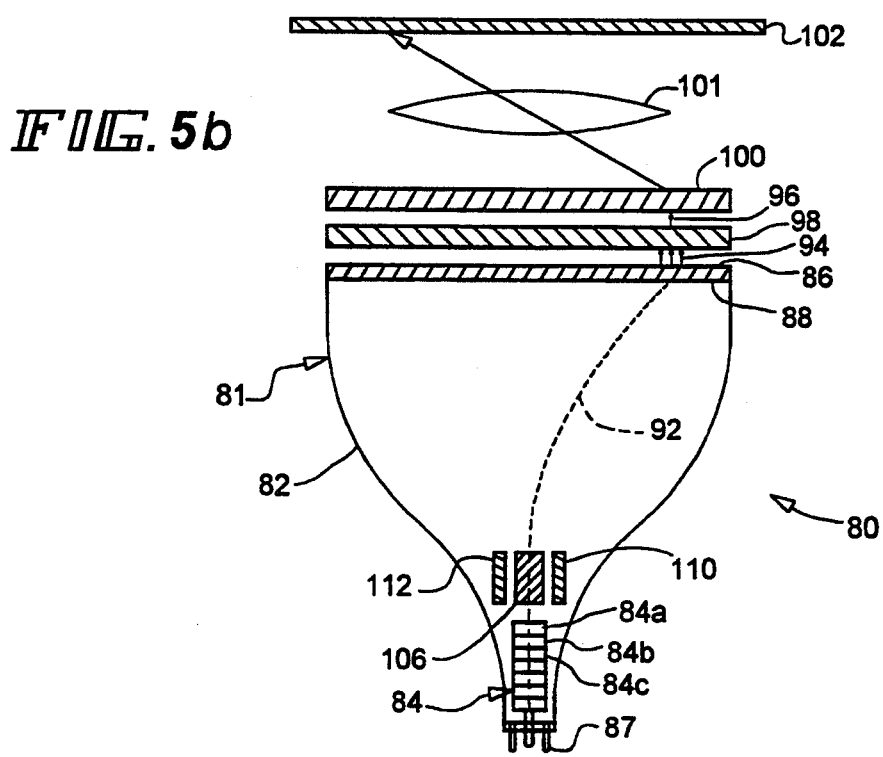
FIG. 5b is a longitudinal cross sectional view of the projection LCD system of FIG. 5a taken along site 5b—5b therein.

Referring to FIG. 5a, there is shown a simplified schematic and block diagram of a cross scanning electron beams light source 80 for use with a projection LCD system in accordance with the present invention. A longitudinal cross sectional view of the projection LCD system of FIG. 5a taken along site line 5b—5b is shown in FIG. 5b. The cross scanning electron beams light source 80 includes a cathode ray tube (CRT) 81 having a glass envelope 82 with a glass faceplate 86 disposed in a sealed manner on a forward edge thereof. Faceplate 86 is preferably flat, or planar, and is generally rectangular in shape as shown in the elevation view of the faceplate of FIG. 6. Envelope 82 is preferably comprised of glass and is generally funnel-shaped having a narrow, tapered end and a wide end upon which faceplate 86 is attached in a sealed manner such as by a conventional glass frit cement.

Disposed in the narrow, tapered end of envelope 82 is an electron gun 84 which is attached to a plurality of conductive pins 87 extending through an end of the envelope to permit the electron gun to be connected to appropriate power and control signal sources which are not shown in the figures for simplicity. Electron gun 84 is of the inline type for directing first and second electron beams 90 and 92 onto the inner surface of faceplate 86. Disposed on the inner surface of faceplate 86 is a layer of phosphor elements 88 which emits light when struck by the energetic electrons in the electron beams 90 and 92. Electron gun 84 includes one or more electron sources, or cathodes (also not shown for simplicity), and a plurality of aligned, charged grids 84a, 84b and 84c for forming the energetic electrons into the first and second electron beams 90, 92, for accelerating the energetic electrons toward the faceplate 86, and for focusing the electron beams on the inner surface of the faceplate.

Figure 6:
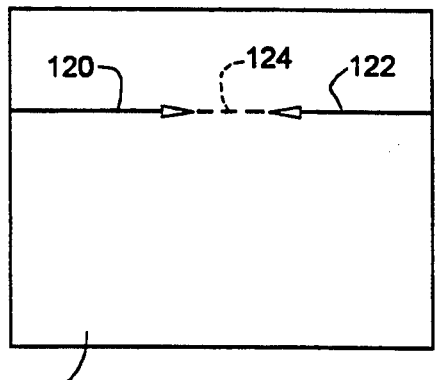
FIG. 6 is an elevation view of the faceplate of the cross scanning electron beams light source of FIG. 5 showing the manner in which a pair of electron beams simultaneously trace a common horizontal scan line in opposite directions in accordance with the present invention.
Figure 7:
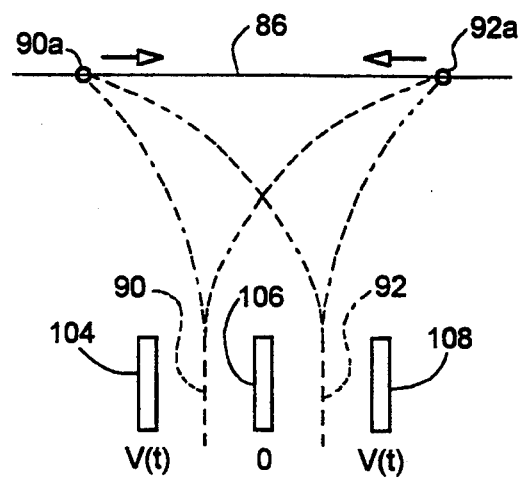
FIG. 7 is a simplified schematic diagram illustrating the manner in which the pair of electron beams are horizontally deflected across the faceplate of the opposed scanning electron beams light source by a plurality of horizontal deflection plates.

With reference to FIGS. 5a, 5b and 6 as well as to FIG. 7, which is a simplified schematic diagram illustrating the manner in which the electron beams 90 and 92 are swept across faceplate 86, the operation of CRT 81 in the inventive cross scanning electron beams light source 80 for use in a projection LCD system will now be described. The first electron beam 90 is directed between a center horizontal deflection plate 106 and a first outer horizontal deflection plate 104. The second electron beam 92 is directed between the center horizontal deflection plate 106 and a second outer horizontal deflection plate 108. Each of the first and second electron beams 90, 92 begins the trace of a common horizontal scan line adjacent an outer, lateral edge of faceplate 86. The first and second electron beams 90, 92 respectively form electron beam spots 90a and 92a on the phosphor coated inner surface of faceplate 86. Each of the electron beam spots 90a, 92a is deflected inwardly such as shown by first and second electron beam traces 120 and 122 along a common horizontal scan line 124 (shown in dotted-line form) as illustrated in FIG. 6. Horizontal deflection of the first and second electron beams 90, 92 is effected by applying a time varying deflection voltage V(t) to the first and second outer horizontal deflection plates 104 and 108. For example, to simultaneously deflect each of the first and second electron beams 90, 92 inwardly, a voltage more negative than that of the center horizontal deflection plate 106 is applied to the first and second outer horizontal deflection plates 104, 108. In a preferred embodiment, the center horizontal deflection plate 106 is maintained at neutral potential and the first and second horizontal deflection plates 104, 108 are charged to a negative voltage which increases as each of the beams approach opposite edges of faceplate 86. Once the end of the common horizontal scan line 124 is reached, each of the first and second electron beams 90, 92 executes a retrace by applying a positive voltage to each of the first and second outer horizontal deflection plates 104, 108.

Figure 8:
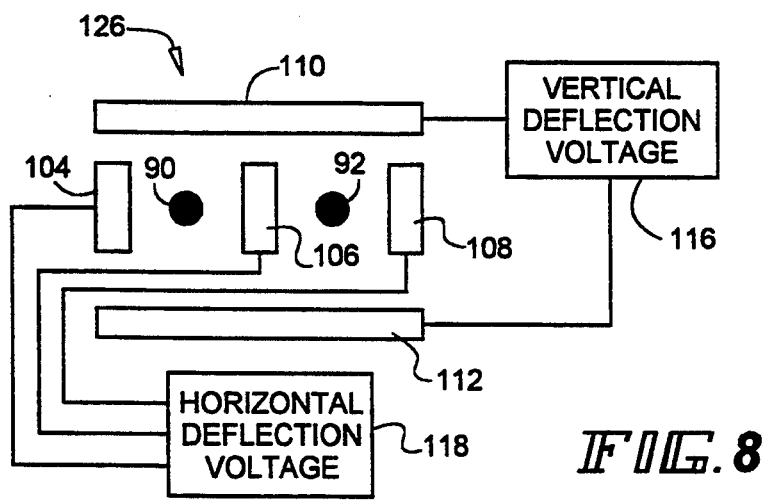
FIG. 8 is a simplified schematic diagram of a deflection plate arrangement for deflecting the pair of electron beams in the cross scanning electron beams light source of the present invention.

Referring to FIG. 8, there is shown an aft elevation view of a beam deflection arrangement 126 employed in one embodiment of the present invention. In addition to the aforementioned center horizontal deflection plate 106 and first and second outer deflection plates 104, 108, the beam deflection arrangement 126 includes upper and lower vertical deflection plates 110 and 112. The center horizontal deflection plate 106 and the first and second outer horizontal deflection plates 104, 108 are coupled to and charged by a horizontal deflection voltage source 118. Horizontal deflection voltage source 118 provides a time-varying voltage V(t) to each of the first and second outer horizontal deflection plates 104, 108 for scanning and retracing the first and second electron beams 90, 92 across faceplate 86. The horizontal deflection voltage source 118 maintains the charge on the center horizontal deflection plate 106 fixed, preferably at zero volts. The upper and lower vertical deflection plates 110, 112 are coupled to and charged by a vertical deflection voltage source 116. The voltage applied to the upper and lower vertical deflection plates 110,, 112 by the vertical deflection voltage source 116 is incremented in a stepwise manner for sequentially positioning the first and second electron beams 90, 92 on the next adjacent horizontal scan line. In one embodiment, the first and second electron beams 90, 92 are deflected downward in a stepwise manner during beam retrace to permit the electron beams to trace the next lower horizontal scan line. Following trace of the bottom horizontal scan line, the vertical deflection voltage source 116 deflects the electron beams 90, 92 upward during a retrace period in preparation for the next electron beam trace of faceplate 86.

Referring back to FIG. 5a, a deflection plate/LCD synchronizer 114 is shown coupled to the vertical and horizontal deflection voltage sources 116, 118 as well as to the LCD panel 100. Deflection plate/LCD synchronizer circuit 114 synchronizes the horizontal and vertical deflection of the first and second electron beams 90, 92 with the actuation of each horizontal array of scanning electrodes of the LCD panel 100. Thus, when a voltage is applied to a given horizontal array of scanning electrodes rendering this portion of the LCD panel 100 transparent, the first and second electron beams 90, 92 are positioned and deflected so as to trace out and form a light beam 94 which is directed only upon the transparent portion of the LCD panel. Light beam 94 formed by a single horizontal trace of the first and second electron beams 90, 92, illuminates only that portion of the LCD panel 100 rendered transparent by a voltage applied to a particular horizontal array of scanning electrodes.

As shown in FIGS. 5a and 5b, the first and second electron beams 90, 92 form a single elongated light beam 94 which is emitted from the front surface of the CRT's faceplate 86. The light beam 94 is directed onto a focusing lens 98 which, in turn, directs a focused light beam 96 onto the LCD panel 100. Disposed in front of the LCD panel 100 is a projection screen 102. The video image presented on the LCD panel 100 is projected via a second focusing lens 101 onto projection screen 102 for viewing. Focusing lens 98 is comprised of an array of small optical lenses disposed intermediate the CRT's faceplate 86 and LCD panel 100 for focusing each elongated, horizontal light beam onto that portion of the LCD panel rendered transparent by one of the horizontal arrays of the scanning electrodes. Thus, LCD panel 100 is illuminated only on that portion of the panel which is transparent. Other portions of LCD panel 100 which are not transparent do not receive any light and thus do not contribute to background brightness affording improved video image contrast which is defined as $$C_{max} = \frac{L_{max}}{L_{min}}$$

where C=maximum contrast,
$L_{max}$=maximum illumination of the display, and
$L_{min}$=minimum illumination of the display.

This invention provides a much better $C_{max}$ value because the value of $L_{min}$ is substantially reduced.

The first and second electron beams 90, 92 preferably have the same current at all times and the same, although opposed, electron optical path to provide each beam with the identical Gaussian beam density distribution. Under these conditions, the two opposed scanning electron beams 90, 92 provide a line light source with a constant, uniform total illuminating energy on every pixel in a given horizontal scan line for the entire horizontal scan line period. Although the instantaneous brightness along a given horizontal scan line at any moment is not uniform, the total illuminating energy integrated over an entire horizontal scan line period will be the same at any individual pixel.

There has thus been shown a projection LCD system wherein display panel backlighting is provided by a CRT. The CRT includes an inline electron gun for directing first and second electron beams onto an inner phosphor layer of a faceplate. The two electron beams are deflected in opposed directions along a common horizontal scan line, where each horizontal scan line on the CRT's faceplate is traced in sequence by the two beams. Each horizontal scan of the CRT's faceplate by the two electron beams produces an elongated, narrow, linear light beam which is directed onto that portion of the LCD panel rendered transparent by a voltage applied to a horizontal array of scanning electrodes on the LCD panel. The two electron beams are displaced over the CRT's faceplate in a raster-like manner, but in opposing directions of horizontal scan. Each horizontal scan of the CRT's faceplate by the two electron beams is synchronized with the turning on of the vertically spaced, horizontal arrays of scanning electrodes to provide a single line light source for illuminating only that portion of the display panel containing video image for improved video image contrast and more efficient LCD panel backlighting.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A projection display apparatus for projecting a video image on a screen comprising:
   a liquid crystal display panel including a generally planar layer of liquid crystal material and a first plurality of transparent scanning electrodes and a second plurality of transparent signal electrodes respectively disposed on first and second facing surfaces of said layer of liquid crystal material, wherein said first and second pluralities of electrodes are respectively arranged in first and second linear, spaced, parallel arrays and wherein said first and second arrays are mutually orthogonal such that each of said first linear arrays of scanning electrodes crosses each of said second linear arrays of signal electrodes, and wherein a voltage is applied to each linear array of scanning electrodes in a sequential manner such that video image information is presented sequentially on said liquid crystal display;
   a cathode ray tube (CRT) including:
   a faceplate disposed in facing relation to the second surface of said layer of liquid crystal material, said faceplate having a layer of phosphor elements disposed on an inner surface thereof;
   electron beam generating means for directing first and second beams of energetic electrons on the inner surface of said faceplate; and
   deflection means for deflecting said first and second electron beams over the inner surface of said faceplate in a raster-like manner, wherein said electron beams are displaced over a common scan line in opposed directions with each sweep of said faceplate for forming a narrow, elongated, linear light beam directed toward said liquid crystal display panel as said energetic electrons strike said phosphor elements, wherein said scan line and light beam are aligned generally parallel to said first linear arrays of scanning electrodes; and
   control means coupled to said first plurality of scanning electrodes and to said deflection means for synchronously applying a voltage to each linear array of scanning electrodes in a sequential manner and deflecting said electron beams such that said light beam is sequentially directed upon each linear array of scanning electrodes as a voltage is applied to said each linear array of scanning electrodes.

2. The projection display apparatus of claim 1 wherein said arrays of scanning electrodes are generally horizontally aligned and wherein said first and second electron beams are displaced in opposed directions over a common horizontal scan line on said faceplate.

3. The projection display apparatus of claim 2 wherein said first and second electron beams have the same current density, and wherein said current density is constant over said horizontal scan line.

4. The projection display apparatus of claim 1 further comprising lens means disposed intermediate said faceplate and said liquid crystal display panel for focusing said light beam on each linear array of scanning electrodes.

5. The projection display apparatus of claim 1 wherein said electron beam generating means includes an axial electron gun including a plurality of charged electrodes arranged in a spaced manner along an axis for generating and accelerating said energetic electrons and focusing said electron beams on said faceplate.

6. The projection display apparatus of claim 5 wherein said deflection means includes a plurality of charged plates disposed intermediate said charged electrodes and said faceplate for deflecting said electron beams across said faceplate in an opposed raster-like manner.

7. The projection display apparatus of claim 6 wherein said deflection means includes upper and lower vertical deflection plates respectively disposed above and below said electron, beams.

8. The projection display apparatus of claim 7 wherein said deflection means further includes first, second and third spaced horizontal deflection plates, wherein said first electron beam is disposed intermediate said first and second horizontal deflection plates and said second electron beam is disposed intermediate said second and third horizontal deflection plates.

9. The projection display apparatus of claim 8 further comprising a horizontal deflection voltage source coupled to said horizontal deflection plates and a vertical deflection voltage source coupled to said vertical deflection plates.

10. The projection display apparatus of claim 9 further comprising deflection plate/LCD synchronizer means coupled to said LCD panel and to said horizontal and vertical deflection voltage sources for applying a voltage to each linear array of scanning electrodes in a sequential manner while synchronously charging said first and second pluralities of horizontal and vertical deflection plates such that said light beam illuminates only a portion of said LCD panel containing video image information.

11. The projection display apparatus of claim 1 wherein said electron beam generating means includes an inline electron gun for directing first and second inline electron beam on the inner surface of said faceplate.

12. A cathode ray tube (CRT) for backlighting a matrix-type projection liquid crystal display (LCD) panel wherein first scanning and second signal pluralities of linear, elongated, parallel transparent electrodes are disposed on facing surfaces of a layer of liquid crystal material with said first and second pluralities of electrodes arranged in mutually orthogonal arrays, and wherein a voltage is applied to each linear array of scanning electrodes in a sequential manner such that video image information is presented sequentially on said liquid crystal display, said CRT comprising:

a faceplate disposed in facing relation to the layer of liquid crystal material and having a layer of phosphor elements disposed on an inner surface thereof;

an inline electron gun for directing first and second beams of energetic electrons on the inner surface of said faceplate; and deflection means for deflecting said first and second electron beams over the inner surface of said faceplate in a raster-like manner, wherein said electron beams are displaced over a common scan line in opposed directions with each sweep of said faceplate for forming a narrow, elongated, linear light beam directed toward said LCD panel as said energetic electrons strike said phosphor elements, wherein said scan line and light beam are aligned generally parallel to said first linear arrays of scanning electrodes.

13. The CRT of claim 12 wherein said deflection means includes a first plurality of charged horizontal deflection plates and a second plurality of charged vertical deflection plates, and wherein said first and second electron beams transit intermediate pairs of spaced horizontal and vertical deflection plates.

14. The CRT of claim 13 further comprising horizontal deflection voltage means for charging said first plurality of horizontal deflection plates and vertical deflection voltage means for charging said second plurality of vertical deflection plates.

15. The CRT of claim 14 further comprising deflection plate/LCD synchronizer means coupled to said LCD panel and to said horizontal and vertical deflection voltage means for applying a voltage to each linear array of scanning electrodes in a sequential manner while synchronously charging said first and second pluralities of horizontal and vertical deflection plates such that said light beam illuminates only a portion of said LCD panel containing video image information.

16. The CRT of claim 15 wherein said first plurality of charged horizontal deflection plates includes a center plate and first and second outer plates, and wherein said first and second electron beams are respectively directed intermediate said center plate and said first and second outer plates, and wherein said second plurality of vertical deflection plates includes upper and lower deflection plates, and wherein said first and second electron beams are directed intermediate said upper and lower deflection plates.

17. The CRT of claim 12 wherein said first and second electron beams have an essentially equal current density.

18. The CRT of claim 12 wherein said faceplate is flat.

* * * * *

UNITED STATES PATENT AND TRADEMARK OFFICE
CERTIFICATE OF CORRECTION

PATENT NO. : 5,381,252
DATED : January 10, 1995
INVENTOR(S) : Hsing-Yao Chen

It is certified that error appears in the above-indentified patent and that said Letters Patent is hereby corrected as shown below:

On the title page: Item [73] change "Prov. of China" to --Republic of China --.

Signed and Sealed this

Twenty-first Day of November, 1995

Attest:

BRUCE LEHMAN

Attesting Officer     Commissioner of Patents and Trademarks

UNITED STATES PATENT AND TRADEMARK OFFICE
CERTIFICATE OF CORRECTION

PATENT NO. : 5,381,252
DATED : January 10, 1995
INVENTOR(S) : Chen

It is certified that error appears in the above-identified patent and that said Letters Patent is hereby corrected as shown below:

<u>Title page,</u>
Item [73], Assignee, change "Chunghawa" to -- Chunghwa --

Signed and Sealed this

Seventeenth Day of August, 2004

JON W. DUDAS
*Acting Director of the United States Patent and Trademark Office*